US011130037B2

(12) United States Patent
Wu (10) Patent No.: US 11,130,037 B2
(45) Date of Patent: Sep. 28, 2021

(54) BOXING FITNESS DEVICE AND DETECTION METHOD THEREOF

(71) Applicant: Strength Master Fitness Tech. Co., Ltd., Puxin Township (TW)

(72) Inventor: Shu-Yao Wu, Puxin Township (TW)

(73) Assignee: Strength Master Fitness Tech. Co., Ltd., Changhua County (TW)

( * ) Notice: Subject to any disclaimer, the term of this patent is extended or adjusted under 35 U.S.C. 154(b) by 92 days.

(21) Appl. No.: 16/007,572

(22) Filed: Jun. 13, 2018

(65) Prior Publication Data
US 2019/0381382 A1    Dec. 19, 2019

(51) Int. Cl.
| | |
|---|---|
| *A63B 69/32* | (2006.01) |
| *A63B 21/22* | (2006.01) |
| *A63B 22/02* | (2006.01) |
| *A63B 22/06* | (2006.01) |
| *A63B 24/00* | (2006.01) |
| *A63B 22/00* | (2006.01) |
| *A63B 71/06* | (2006.01) |
| *A63B 21/008* | (2006.01) |
| *G06F 3/01* | (2006.01) |

(52) U.S. Cl.
CPC .......... *A63B 69/32* (2013.01); *A63B 21/0088* (2013.01); *A63B 21/225* (2013.01); *A63B 22/0012* (2013.01); *A63B 22/02* (2013.01); *A63B 22/06* (2013.01); *A63B 24/0062* (2013.01); *A63B 24/0087* (2013.01); *A63B 71/0619* (2013.01); *G06F 3/014* (2013.01); *A63B 2220/50* (2013.01); *A63B 2220/833* (2013.01); *A63B 2220/836* (2013.01); *A63B 2225/10* (2013.01); *A63B 2244/102* (2013.01)

(58) Field of Classification Search
CPC . A63B 69/32; A63B 24/0062; A63B 24/0087; A63B 21/0088; A63B 22/0012; A63B 71/0619; A63B 22/02; A63B 21/225; A63B 22/06; A63B 2220/836; A63B 2244/102; A63B 2220/833; A63B 2225/10; A63B 2220/50; G06F 3/014
See application file for complete search history.

(56) References Cited

U.S. PATENT DOCUMENTS

| | | | | |
|---|---|---|---|---|
| 9,511,262 | B1* | 12/2016 | DePompe | A63B 69/32 |
| 2003/0217582 | A1* | 11/2003 | Reinbold | A63B 69/32 |
| | | | | 73/12.09 |

(Continued)

*Primary Examiner* — Sundhara M Ganesan
*Assistant Examiner* — Shila Jalalzadeh Abyaneh
(74) *Attorney, Agent, or Firm* — Wang Law Firm, Inc.

(57) ABSTRACT

The present invention relates to a boxing fitness device and a detection method thereof, the boxing fitness device of the present invention includes a frame, punching zones, prompting devices, sensing devices, a first wearable device, a second wearable device and a computation unit. The punching zones are disposed in the frame and the prompting devices are disposed on the punching zones, respectively. When a left hand or a right hand of a user touches one of the punching zones, the sensing devices can sense a first to-be-sensed part of a first wearable device or a second to-be-sensed part of a second wearable device worn on the hands of the user. As a result, the boxing fitness device and the detection method thereof of the present invention can sense the first to-be-sensed part and the second to-be-sensed part to detect the user's correct punching action.

8 Claims, 6 Drawing Sheets

(56) References Cited

U.S. PATENT DOCUMENTS

| | | | |
|---|---|---|---|
| 2004/0110605 A1* | 6/2004 | Wang | A63B 69/34 482/83 |
| 2008/0088303 A1* | 4/2008 | Englert | A63B 24/0021 324/226 |
| 2010/0130329 A1* | 5/2010 | Sullivan | A63B 69/34 482/4 |
| 2012/0108394 A1* | 5/2012 | Jones | A63B 69/004 482/8 |
| 2015/0360110 A1* | 12/2015 | Burt, Jr. | A63B 71/0622 482/7 |
| 2017/0087434 A1* | 3/2017 | Coles | A63B 69/20 |

* cited by examiner

```
┌─────────────────────────────────────────────┐
│ Using a plurality of prompting devices to   │
│ output a prompt message to the plurality of │
│ punching zones, according to a control      │
│ signal, so as to prompt a user to           │ ~S101
│ approximates or touch one of the plurality  │
│ of punching zones, wherein the user wears   │
│ the first wearable device and the second    │
│ wearable device on the left hand and the    │
│ right hand thereof, respectively            │
└─────────────────────────────────────────────┘
                      ↓
┌─────────────────────────────────────────────┐
│ Sensing, by a plurality of sensing devices  │
│ electrically connected to the plurality of  │
│ punching zones, a first to-be-sensed part   │
│ of the first wearable device or a second    │ ~S102
│ to-be-sensed part of the second wearable    │
│ device, to generate a first sensing signal  │
│ or a second sensing signal, respectively    │
└─────────────────────────────────────────────┘
                      ↓
┌─────────────────────────────────────────────┐
│ Using a processing terminal to provide a    │
│ setting signal to a computation unit        │ ~S103
│ electrically connected to the sensing device│
└─────────────────────────────────────────────┘
                      ↓
┌─────────────────────────────────────────────┐
│ Using a computation unit to generate the    │
│ control signal according to the setting     │ ~S104
│ signal, the first sensing signal and the    │
│ second sensing signal                       │
└─────────────────────────────────────────────┘
                      ↓
┌─────────────────────────────────────────────┐
│ Controlling, by the computation unit, the   │
│ prompting device to display an error        │
│ message according to the first sensing      │
│ signal or the second sensing signal when a  │ ~S105
│ left hand or a right hand of the user       │
│ approximates or touches one of the plurality│
│ of punching zones not displaying the        │
│ prompt message                              │
└─────────────────────────────────────────────┘
```

FIG. 6

BOXING FITNESS DEVICE AND DETECTION METHOD THEREOF

BACKGROUND OF THE INVENTION

1. Field of the Invention

The present invention generally relates to a boxing fitness device and a detection method thereof, more particularly to a boxing fitness device which is able to detect a punching action of a user and further interconnect with multiple boxing fitness devices for exercise and a detection method thereof.

2. Description of the Related Art

In recent years, conventional aerobic exercise machines have been used to only train a certain parts of the user's body, for example, treadmills and flywheels training muscles of the lower body only. Fewer exercise machines can fully exercise the muscles of the whole body. Furthermore, most conventional exercise machines operate independently and are in a condition such that many people are exercising at the same time in an exercise space such as a gym. It also difficult for those exercisers to communicate with and to encourage each other, and in this way, the exerciser may feel bored during a long period of exercise. Therefore, a necessary part of developing a boxing fitness device and a detection method thereof is to solve the above-mentioned conventional problems.

SUMMARY OF THE INVENTION

In order to solve these conventional problems, the present invention provides a boxing fitness device and a detection method thereof. The boxing fitness device is able to detect the punching action of a user for training the user's hand eye coordination and motion control accuracy. Furthermore, multiple boxing fitness devices can be interconnected to each other, each with the ability to perform a group battle game, or perform in a group course led by a fitness coach, so that the exercisers can encourage each other and improve the comradery of the sports atmosphere.

According to an embodiment, the present invention provides a boxing fitness device comprising a plurality of punching zones, a plurality of prompting devices, a plurality of sensing devices, a first wearable device, a second wearable device and a computation unit. The plurality of punching zones are disposed in the frame and the plurality of prompting devices are disposed on the plurality of punching zones, respectively and each prompting device can output a prompt message according to the control signal. The plurality of sensing devices are electrically connected to the plurality of punching zones, respectively. The first wearable device comprises a first to-be-sensed part and when the first wearable device approximates or touches one of the plurality of punching zones, the sensing devices can sense the first to-be-sensed part and generate a first sensing signal. The second wearable device comprises a second to-be-sensed part, when the second wearable device approximates or touches one of the plurality of punching zones, the sensing devices can sense the second to-be-sensed part and generate the second sensing signal. The computation unit is electrically connected to the plurality of sensing devices and is configured to generate a control signal according to the setting signal, the first sensing signal and a second sensing signal, and the computation unit can communicate with a processing terminal and at least one other boxing fitness device.

Preferably, the frame comprises a connection structure connected to an exercise machine and the exercise machine comprises a treadmill, a flywheel, a fan bike, an exercise bike, or a stepping machine.

Preferably, one of the first wearable device and the second wearable device comprises a boxing glove.

Preferably, the at least one prompting device displays the prompt message on at least one of the plurality of punching zones within a preset time. This prompts the user to approximate or touch the punching zone using the left hand or the right hand thereof according to the prompt message. The sensing devices can then sense the first to-be-sensed part of the first wearable device or the second to-be-sensed part of the second wearable device.

Preferably, the right hand or left hand of the user approximates or touches the plurality of punching zones opposite to the left hand or the right hand thereof, or the user approximates or touches one of a plurality of punching zones corresponding in position to a central line of the body by the right hand or left hand thereof. If the user does not approximate or touch one of the plurality of punching zones, or does not approximate or touch the punching zone displaying the prompt message, the sensing devices sense the first to-be-sensed part of the first wearable device or the second to-be-sensed part of the second wearable device, and the computation unit controls the prompting device to display an error message.

Preferably, the computation unit generates, according to the first sensing signal and the second sensing signal, approximating data or touch data, and the processing terminal can provide the setting signal to the computation unit and receive and display the punch data.

Preferably, the first to-be-sensed part and the second to-be-sensed part comprises different polarities, different electrical properties, different identifiers and/or different light wavelengths. The sensing devices can determine, according to the different polarities, different electrical properties, different identifiers or different light wavelengths of the first to-be-sensed part and the second to-be-sensed part, whether the left hand or right hand of the user approximates or touches one of the plurality of punching zones. In addition, when the first to-be-sensed part or the second to-be-sensed part approximates or touches one of the plurality of punching zones, the first to-be-sensed part or the second to-be-sensed part can generate the first signal or the second signal, respectively. In this way, the sensing device can determine, according to the first signal and the second signal, whether the left hand or right hand of the user approximates or touches one of the plurality of punching zones.

According to an embodiment, the present invention provides a detection method for a boxing fitness device and the method comprises the following steps: using a plurality of prompting devices to output a prompt signal to a plurality of punching zones according to a control message, so as to prompt a user to touch one of the plurality of punching zones by a left hand or right hand thereof, wherein the user wears a first wearable device and a second wearable device on the left hand and right hand, respectively; sensing, by the plurality of plurality of sensing devices electrically connected to the plurality of plurality of punching zones, a first to-be-sensed part of the first wearable device or a second to-be-sensed part of the second wearable device, so as to generate a first sensing signal or a second sensing signal, respectively; providing, by a processing terminal, a setting signal to a computation unit electrically connected to the plurality of sensing devices; generating, by a computation unit, the control signal according to the setting signal, the first sensing signal, the second sensing signal; when the left hand or the right hand of the user approximates or touch to the punching zone not displaying the prompt message, controlling, by the computation unit, the prompting device to display an error message according to the first sensing signal or the second sensing signal; and, using the computation unit to communicate with at least one other boxing fitness device and the processing terminal.

Preferably, the right hand or left hand of the user can approximate or touch one of plurality of punching zones opposite to the left hand or right hand, or the user can approximate or touch one of plurality of punching zones corresponding in position to a central line of the body, by the right hand or left hand, and when the user does not approximate or touch one of plurality of punching zones opposite to the left hand or the right hand but the sensing device sense the first to-be-sensed part of the first wearable device or the second to-be-sensed part of the second wearable device, the computation unit controls the prompting device to display an error message.

Preferably, the first to-be-sensed part and the second to-be-sensed part comprises different polarities, different electrical properties, different identifiers, and/or different light wavelengths, and the sensing devices can determine, according to the different polarities, different electrical properties, different identifier or different light wavelengths of the first to-be-sensed part and the second to-be-sensed part, whether the left hand or right hand of the user approximates or touches one of the plurality of punching zone; or, when the first to-be-sensed part or the second to-be-sensed part approximates or touches one of the plurality of punching zones, the sensing device can be determined, according to the first signal and the second signal, whether the left hand or right hand of the user approximates or touches one of the plurality of punching zones.

BRIEF DESCRIPTION OF THE DRAWINGS

The structure, operating principle and effects of the present invention will be described in detail by way of various embodiments, which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third' and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

Refer to FIGS. 1 to 6, which are schematic views and sectional views of a boxing fitness device of an embodiment of the present invention, and schematic views of a boxing fitness device of a first embodiment, and schematic views of a boxing fitness device of a second embodiment, schematic views and a boxing fitness device of a third embodiment, and flow chart of a detection method of the present invention, respectively.

Figure 1:
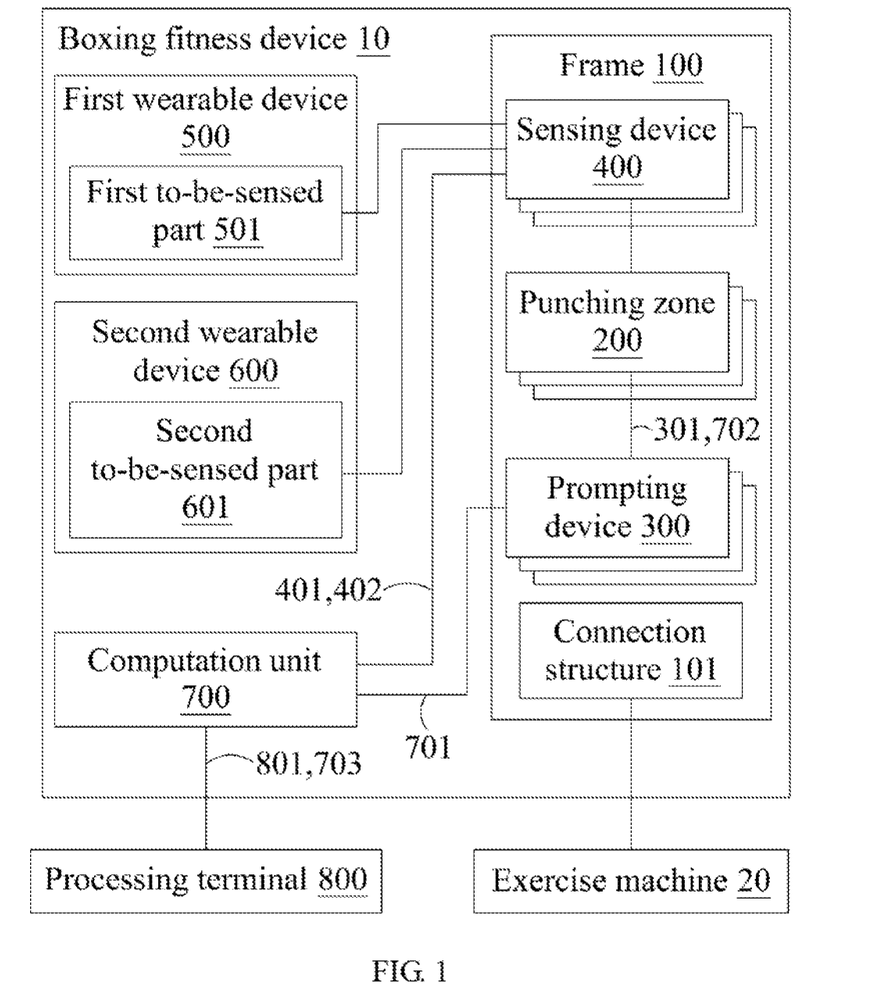
FIG. 1 is a schematic view of a boxing fitness device of an embodiment of the present invention.
Figure 2:
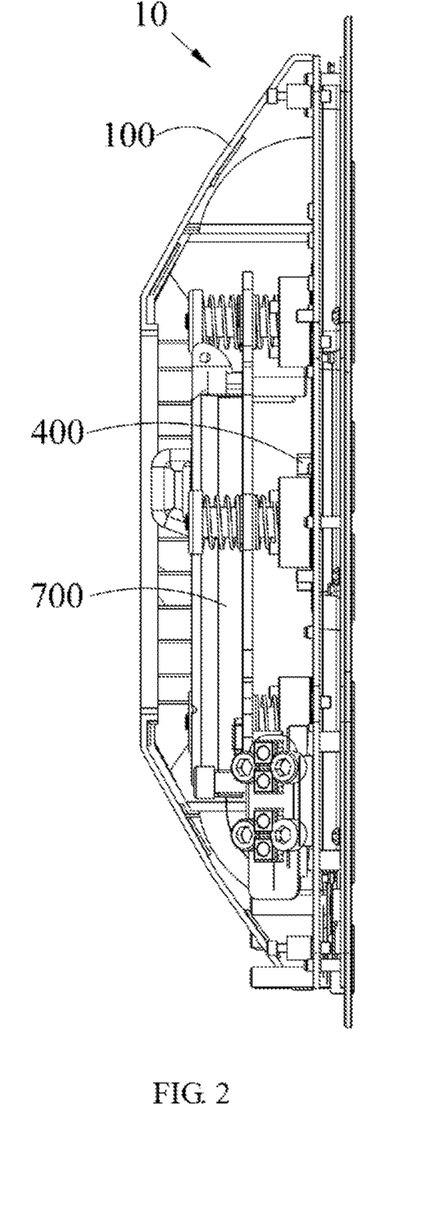
FIG. 2 is a sectional view of a boxing fitness device of an embodiment of the present invention.
Figure 3:
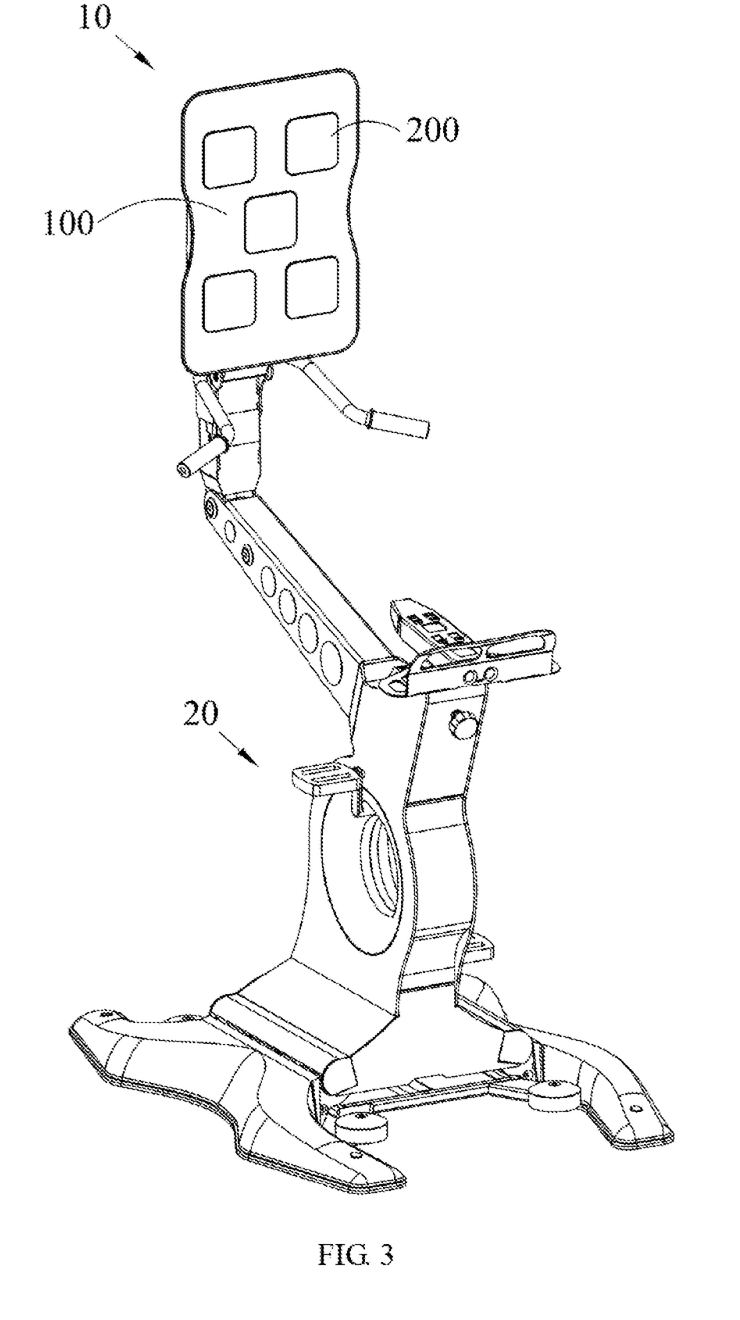
FIG. 3 is a schematic view of a boxing fitness device of a first embodiment of the present invention.
Figure 4:
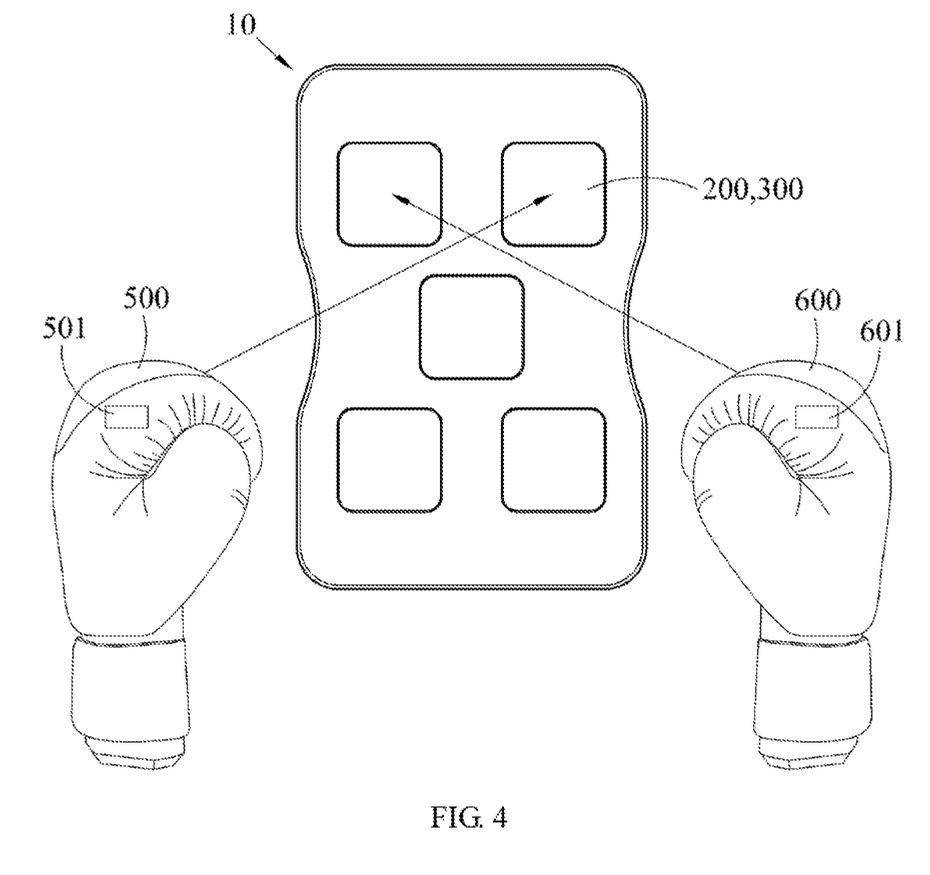
FIG. 4 is a schematic view of a boxing fitness device of a second embodiment of the present invention.
Figure 5:
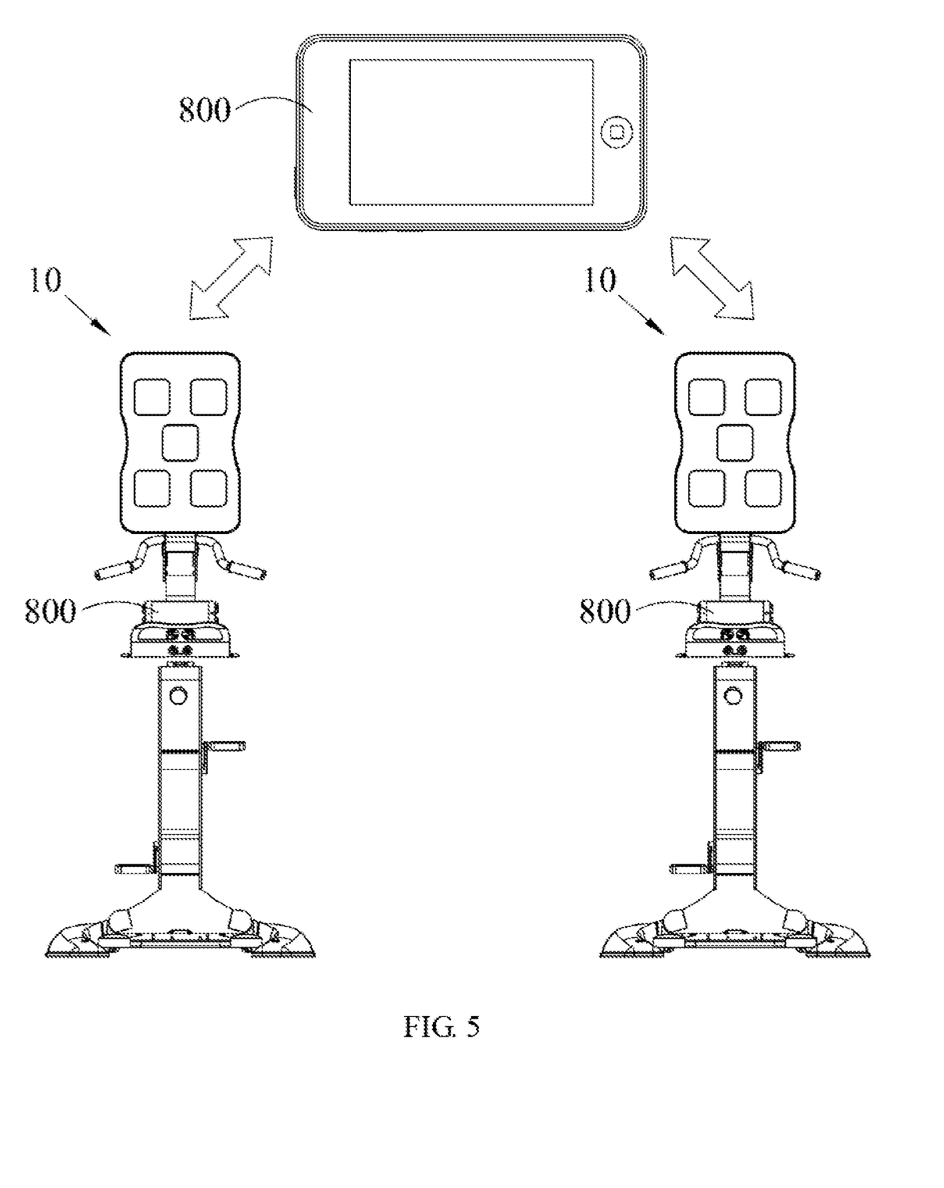
FIG. 5 is a schematic view of a boxing fitness device of a third embodiment of the present invention.

As shown in FIG. 1, the boxing fitness device 10 comprises a frame 100, a plurality of punching zones 200, a plurality of prompting devices 300, a plurality of sensing devices 400, a first wearable device 500, a second wearable device 600 and a computation unit 700.

The plurality of punching zones 200 can be disposed in the frame 100; in an embodiment, the frame 100 can be made by the hard plastic, and the punching zone 200 can comprise flexible material, such as silica gel or rubber, so as to absorb impact force of punch action of the user, thereby reducing the impact force applied on the hand during the punch action and preventing the user's hand from injure.

The plurality of prompting devices 300 are disposed on the plurality of punching zones 200, respectively, and each prompting device 300 is configured to output a prompt message 301 according to the control signal 701. In an embodiment, the prompting device 300 includes at least one of: an audio component, a LED component, and/or a vibration motor, so as to provide at least one of: a sound message, a visual message, a light message, and/or a vibration message.

Furthermore, in an embodiment, each of the first to-be-sensed part 501 and the second to-be-sensed part 601 can include an electronic marker, such as a RFID tag, for the sensing devices 400 to sense. The electronic marker can be an active electronic marker, or a semi-passive electronic marker of a passive electronic marker, so as to facilitate to accurately and quickly determine whether one of the plurality of punch zones 200 is punched by the left hand or the right hand of the user.

The plurality of sensing devices 400 are electrically connected to the plurality of punching zones 200, respectively. The first wearable device 500 comprises a first to-be-sensed part 501, and the second wearable device 600 includes a second to-be-sensed part 601. When the first wearable device 500 or the second wearable device 600 approximates or touches one of the punching zones 200, the sensing devices 400 can sense the first to-be-sensed part 501 or a second to-be-sensed part 601 and generate a first sensing signal 401 and a second sensing signal 402. The user can wear a first wearable device 500 and a second wearable device 600, and approximate or touch one of the plurality of punching zones 200 by the left hand or the right hand, for example, the user can punch one of the punching zones 200. In an embodiment, the first wearable device 500 or the second wearable device 600 can comprise a boxing glove, and the user can wear the boxing glove.

In an embodiment, one of the sensing devices 400, the first to-be-sensed part 501 and the second to-be-sensed part 601 can include a Hall sensor, so that a distance between the sensing devices 400, the first to-be-sensed part 501 and the second to-be-sensed part 601 can be sensed by a magnetic manner; and, by sensing the magnetic variation or magnetic change, the sensing devices 400 can determine that the first wearable device 500 or the second wearable device 600 approximates or touches which punching zone 200.

In an embodiment, the first to-be-sensed part 501 and the second to-be-sensed part 601 comprises different polarities, different electrical properties, different identifiers, and/or different light wavelengths, and the sensing devices 400 can determine, according to the different polarities, different electrical properties, different identifier or different light wavelengths of first to-be-sensed part 501 and second to-be-sensed part 601, whether the left hand or the right hand of the user approximates or touches one of the plurality of punching zone 200, for example, the sensing devices 400 can determine that the user punches which punching zone 200.

In detail, in an embodiment, one of the first to-be-sensed part 501 and the second to-be-sensed part 601 may be N pole another may be S pole. Furthermore, in an embodiment, the resistance, the conductivity, the capacitance or the inductance of the first to-be-sensed part 501 or the second to-be-sensed part 601 may be different from another. Moreover, in an embodiment, the first to-be-sensed part 501 and the second to-be-sensed part 601 may have different identifier, such like code, barcode, identification Number and etc. Besides, in an embodiment, the first to-be-sensed part 501 and the second to-be-sensed part 601 may emit different light wavelengths, such like 800 nm and 900 nm, The first to-be-sensed part 501 and the second to-be-sensed part 601 can generate the first signal and a second signal, respectively, when approximating or touching one of the plurality of punching zones 200, and the sensing devices 400 can determine, according to first signal and the second signal, whether the left hand or right hand of the user approximates or touches the punching zone 200. In an embodiment, the first to-be-sensed part 501 and the second to-be-sensed part 601 can include a first pressure sensing unit and a second pressure sensing unit, respectively, and when the user punches one of the punching zones 200, the first pressure sensing unit and the second pressure sensing unit can generate first signal and a second signal, respectively, so that the sensing device 400 can determine whether the left hand or right hand of the user punches the punching zone 200 according to the first signal and the second signal.

When the left hand or right hand of the user approximates or touches (such as, punch) one of the punching zone 200, the sensing devices 400 can sense the first to-be-sensed part 501 and generate the first sensing signal 401, and when the second wearable device 600 approximates or touches one of the punching zones 200, the sensing devices 400 can sense the second to-be-sensed part 601 and generate the second sensing signal 402.

The computation unit 700 can be electrically connected to the plurality of sensing devices 400 and generate the control signal 701 according to the setting signal 801, the first sensing signal 401 and the second sensing signal 402, and the computation unit 700 can also communicate with other boxing fitness device 10 and the processing terminal 800, such as through network. The computation unit 700 may include CPU, MCU and etc. In an embodiment, the computation unit 700 can generate punch data 703 according to the first sensing signal 401 and the second sensing signal 402, and the processing terminal 800 is electrically connected to another boxing fitness device 10, and is configured to provide the setting signal 801 to the computation unit 700, and receive and display the punch data 703. In an embodiment, the boxing fitness device 10 of the present invention can perform a multi-player interconnection for a group battle game or a group course led by a fitness coach; for example, the processing terminal 800 can input an exercise plan including the timing of punching action, an interval between punching actions, exercise time, exercise strength and so on.

In detail, the processing terminal 800 can be a system including a computer, a tablet computer, a cell phone, a projector, or a display screen, and devices of the system can be adjusted upon the number of the user, for example, when there are numerous exercisers in a group battle game or a group course led by the fitness coach, each exerciser can watch the punch data 703 thereof through a tablet computer or a cell phone and the data of all exercisers can also be projected on a projection screen in the exercise space for the exercisers to watch and further motivate each other, so as to increase sports atmosphere.

In an embodiment, the frame 100 can comprise a connection structure 101 to electrically connect to an exercise machine 20 such as a treadmill, a flywheel, a fan bike, an exercise bike, or a stepping machine. As a result, after the boxing fitness device 10 of the present invention is electrically connected to other exercise machine 20, the user can perform the preset exercise on the exercise machine 20, such as jogging or riding flywheel, and also can use the boxing fitness device 10 of the present invention to train an upper body thereof. Furthermore, in a condition that the frequency of punching actions of the user is high enough, the physical energy of the user can be consumed quickly and the heart rate of the user can be increased, so that the user can perform high intensity interval training (HIIT) safely, so as to train a lactic acid system, which is one of three energy systems of human body. The conventional aerobic exercise machine can only train the aerobic system of the user. As a result, the boxing fitness device 10 of the present invention can provide diverse training modes.

Furthermore, in an embodiment, the first to-be-sensed part 501 and the second to-be-sensed part 601 can also detect the user's heart rate and transmit the detect data to the computation unit 700 to calculate heat consumption, so that the user can know the exercise intensity thereof. Furthermore, in other embodiment, the boxing fitness device 10 can be integrated with a heart rate detection device of the exercise machine 20, so that the user can know the exercise intensity and heat consumption thereof.

Figure 6:
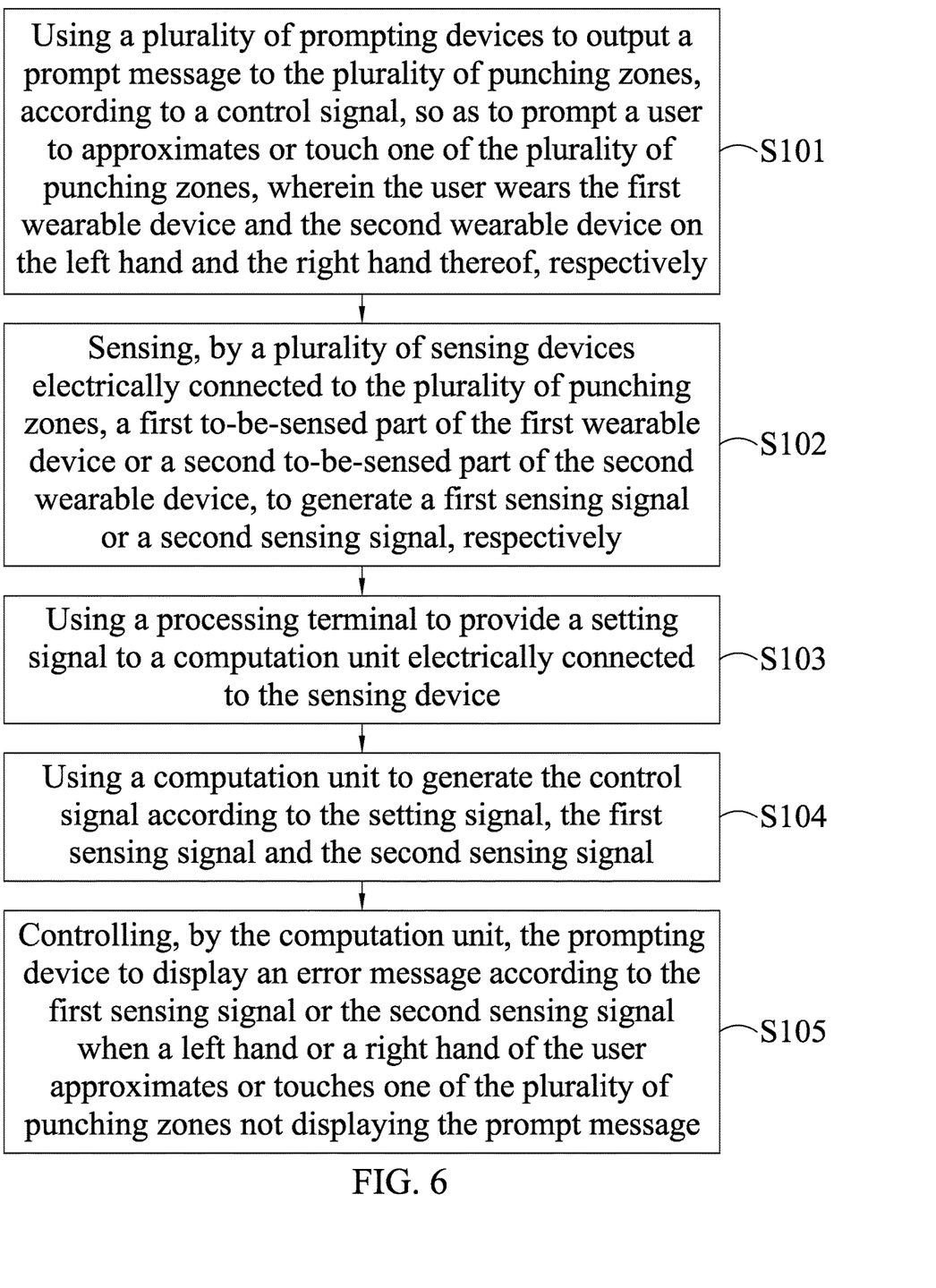
FIG. 6 is a flow chart of a method applied to a boxing fitness device, according to an embodiment of the present invention.

According to above-mentioned content, the boxing fitness device of the present invention can sense whether the left hand or right hand of the user approximates or touches the punching zone 200. A detection method of the present invention can be applied to the boxing fitness device, and includes steps S101 to S106.

In the step S101, the prompting devices 300 output the prompt message 301 to the punching zone 200, according to control signal 701, prompting the user to approximate or touch one of the punch zone 200 according to the prompt message 301 the prompt message 301, and the user can wear the first wearable device 500 and the second wearable device 600 on the left hand and the right hand, respectively.

In the step S102, the sensing devices 400 are electrically connected to the punching zones 200 and configured to sense the first to-be-sensed part 501 of the first wearable device 500 and the second to-be-sensed part 502 of the second wearable device 600, so as to generate the first sensing signal 401 and a second sensing signal 402, respectively.

In the step S103, the processing terminal 800 provides the setting signal 801 to the computation unit 700 electrically connected to the plurality of sensing devices 400.

In the step S104, the computation unit 700 generates the control signal 701 according to the setting signal 801, the first sensing signal 401 and the second sensing signal 402.

In the step S105, when the left hand or right hand of the user approximates or touches to the punching zone 200 not displaying the prompt message 301, the computation unit 700 can control the prompting device 300 to display the error message 702, according to first sensing signal 401 or the second sensing signal 402.

In the step S106, the computation unit 700 can communicate with at least one other boxing fitness device 10 and the processing terminal 800.

In an embodiment, the prompting device 300 can display the prompt message 301 on the punching zone 200 within a preset time, prompting the user to approximate or touch one of the punching zones 200 by the left hand or the right hand thereof according to prompt message 301, and the sensing devices 400 can sense the first wearable device 500 or the second wearable device 600. In an embodiment, the prompting device 300 can display at least one prompt message 301 on at least one of the plurality of punching zones 200 per second, for example, the LED components disposed on at least one of the punching zone 200 can display a prompt pattern per second, prompting the user to approximate or touch one of the punching zones 200. The user can use the processing terminal 800 to adjust the prompting device 300 to change the way of displaying the prompt messages 301, so as to change the difficulty of the punching exercise, for example, the prompting device 300 can display more prompt messages 301 within a shorter time, thereby increasing the difficulty of correctly punching the punching zone 200.

The left hand or the right hand of the user can approximate or touch one of the plurality of punching zones 200 opposite to the left hand or right hand, or the user can approximate or touch one of the plurality of punching zones 200 corresponding to a central line of the body, by one of the right hand or left hand. When the user does not approximate or touch one of the plurality of punching zones 200, the computation unit 700 can control the prompting device 300 to display the error message 702. When the user approximates or touches to the punching zone 200 not displaying the prompt message 301, the sensing devices 400 can sense the first wearable device 500 or the second wearable device 600, and the computation unit 700 controls the prompting device 300 to display the error message 702.

In an embodiment, in a condition that the user wears the first wearable device 500 on the left hand and the second wearable device 600 on the right hand, during exercise, the use should approximate or touch the punching zone 200 at right side of the user by left hand (that is, the sensing devices 400 at right side of the user can sense the first wearable device 500), or the user should approximate or touch the punching zone 200 at the left side of the user by the right hand (that is, the sensing devices 400 at left side of the user can sense the second wearable device 600), and the user should approximate or touch the punching zone 200 corresponding to the central line of the user body by the left hand or the right hand thereof. When the first wearable device 500 or the second wearable device 600 approximates or touches the wrong punching zone 200, the computation unit 700 controls the prompting device 300 to display the error message 702.

The boxing fitness device and the detection method thereof of the present invention can accurately detect whether the user approximates or touches the punching zone 200 by the correct hand, and the boxing fitness device and the detection method thereof can be integrated with the exercise machine 20 to provide diverse exercise modes for training cardiopulmonary function. When the user punches, the user can train the triceps, the deltoid muscles and any antagonist muscle group thereof (such as biceps); and, in order to improve trunk stability, the user can also train core muscles; furthermore, the user can also use the exercise machine 20 to train muscles of lower body, such as the quadriceps, so that the user can achieve the target of training whole body muscles. Furthermore, while using the boxing fitness device of the present invention, the user is required to punch the correct punching zone 200, so this exercise can also train the user's body coordination and improve the body controllability, hand eye coordination, and motion control precision.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A boxing fitness device, comprising:
   a frame;
   a plurality of punching zones disposed in the frame;
   a plurality of prompting devices disposed on the plurality of punching zones, respectively and wherein each of the plurality of prompting devices are configured to output a prompt message according to a control signal;
   a plurality of sensing devices electrically connected to the plurality of punching zones, respectively;
   a first wearable device comprising a first to-be-sensed part and wherein the plurality of sensing devices are configured to sense the first to-be-sensed part to generate a first sensing signal when the first wearable device approximates or touches one of the plurality of punching zones;
   a second wearable device comprising a second to-be-sensed part and wherein the plurality of sensing devices are configured to sense the second to-be-sensed part to generate a second sensing signal when the second wearable device approximates or touches one of the plurality of punching zones; and a computation unit electrically connected to the plurality of sensing devices and configured to generate the control signal according to a setting signal, the first sensing signal and the second sensing signal;

wherein the first to-be-sensed part and the second to-be-sensed part are distinguishable to the plurality of the sensing devices in terms of one or more physical properties selected from a group consisting of magnetic polarities, electrical properties and light wavelengths;

wherein a left hand of a user wearing the first wearable device is required to approximate or touch one of the plurality of punching zones at a right side of the user and a right hand of the user wearing the second wearable device is required to approximate or touch one of the plurality of punching zones at a left side of the user, and when a wrong hand is sensed at one of the plurality of punching zones, the computation unit controls one of the plurality of the prompting devices of the punching zone where the wrong hand is sensed to display an error message.

2. The boxing fitness device according to claim 1, wherein the frame comprises a connection structure electrically connected to an exercise machine, and the exercise machine comprises a treadmill, a flywheel, a fan bike, an exercise bike, or a stepping machine.

3. The boxing fitness device according to claim 1, wherein the first wearable device and the second wearable device comprises a boxing glove.

4. The boxing fitness device according to claim 1, wherein at least one of the plurality of prompting devices is configured to display the prompt message on at least one of the plurality of punching zones within a preset time, to prompt the user to approximate or touch the at least one of the plurality of punching zones by the left hand or the right hand thereof according to the prompt message, and the plurality of sensing devices sense the first to-be-sensed part of the first wearable device worn on the left hand of the user or the second to-be-sensed part of the second wearable device worn on the right hand of the user.

5. The boxing fitness device according to claim 1, wherein the computation unit is configured to generate punch data according to the first sensing signal and the second sensing signal, and a processing terminal provides the setting signal to the computation unit, and receives and displays the punch data.

6. The boxing fitness device according to claim 1, wherein the first to-be-sensed part and the second to-be-sensed part comprise different polarities, different electrical properties, different identifiers and different light wavelengths, and the plurality of sensing devices sense, according to the different polarities, different electrical properties, different identifiers or different light wavelengths of the first to-be-sensed part and the second to-be-sensed part, whether the right hand or the left hand of the user approximates or touches one of the plurality of punching zones, or, the first to-be-sensed part or the second to-be-sensed part each generates a signal, respectively, when approximating or touching one of the plurality of punching zones, and the plurality of sensing devices determine whether the left hand or the right hand of the user approximates or touches one of the plurality of punching zones according to the generated signal.

7. A detection method for a boxing fitness device, comprising:

outputting, by a plurality of prompting devices, a prompt message to a plurality of punching zones, according to a control signal, so as to prompt a user to approximate or touch one of the plurality of punching zones, wherein the user wears a first wearable device and a second wearable device on a left hand and a right hand thereof, respectively;

sensing, by a plurality of sensing devices electrically connected to the plurality of punching zones, a first to-be-sensed part of the first wearable device or a second to-be-sensed part of the second wearable device, to generate a first sensing signal or a second sensing signal, respectively, wherein the left hand of the user wearing the first wearable device is required to approximate or touch one of the plurality of punching zones at a right side of the user and the right hand of the user wearing the second wearable device is required to approximate or touch one of the plurality of punching zones at a left side of the user;

providing, by a processing terminal, a setting signal to a computation unit electrically connected to the plurality of sensing devices;

generating, by the computation unit, the control signal according to the setting signal, the first sensing signal and the second sensing signal; and controlling, by the computation unit and when a wrong hand is sensed at one of the plurality of punching zones, the prompting device of the punching zone where the wrong hand is sensed to display an error message;

wherein the first to-be-sensed part and the second to-be-sensed part are distinguishable to the plurality of the sensing devices in terms of one or more physical properties selected from a group consisting of magnetic polarities, electrical properties and light wavelengths.

8. The detection method according to claim 7, wherein the first to-be-sensed part and the second to-be-sensed part comprise different polarities, different electrical properties, different identifiers and different light wavelengths, and the plurality of sensing devices sense, according to the different polarities, different electrical properties, different identifiers or different light wavelengths of the first to-be-sensed part and the second to-be-sensed part, whether the left hand or the right hand of the user approximates or touches one of the plurality of punching zones, or, the first to-be-sensed part or the second to-be-sensed part each generates a signal, respectively, when approximating or touching one of the plurality of punching zones, and the plurality of sensing devices sense whether the left hand or the right hand of the user approximates or touches one of the plurality of punching zones according to the generated signal.

* * * * *